Jan. 9, 1945. C. E. KEW Re. 22,588

ELECTRICAL CONTROL SYSTEM

Original Filed July 31, 1940 2 Sheets-Sheet 1

Inventor

Charles E. Kew.

By R. S. A. Dougherty.

Attorney

Jan. 9, 1945. C. E. KEW Re. 22,588

ELECTRICAL CONTROL SYSTEM

Original Filed July 31, 1940 2 Sheets-Sheet 2

Inventor

Charles E. Kew.

By R. S. A. Dougherty.

Attorney

Reissued Jan. 9, 1945

Re. 22,588

UNITED STATES PATENT OFFICE 22,588

ELECTRICAL CONTROL SYSTEM

Charles E. Kew, Hamburg, N. Y., assignor, by mesne assignments, to General Motors Corporation, Detroit, Mich., a corporation of Delaware Original No. 2,250,673, dated July 29, 1941, Serial No. 343,665, July 31, 1940. Application for reissue July 29, 1942, Serial No. 452,789

29 Claims. (Cl. 290—17)

My invention relates to an improvement in electrical control systems for a self-propelled vehicle with a prime mover and a direct current electric motor drive such as a Diesel-electric locomotive.

The chief object of this system of electrical control is to provide means for automatically eliminating wheel slippage upon starting the vehicle.

A second object is to provide a system of control for a self-propelled vehicle which automatically overcomes any wheel slippage that may occur upon opening of the throttle for starting and which, upon elimination of said wheel slippage, automatically governs the acceleration of the vehicle until the speed of said vehicle corresponds to the setting of the throttle.

Another object is to provide means to sand the track in front of the leading wheels automatically and simultaneously with the slip prevention means and to assist in stopping the slippage and in restarting the vehicle.

In a self-propelled vehicle of this type each pair of wheels has an axle to which an electric motor is permanently coupled and the only mechanical connection between the motors is through the track upon which the wheels of the vehicle travel. These motors are usually series wound direct current motors and initially are connected in series because a greater starting torque is obtained with such an arrangement with less current drain on the generator. In starting, one pair of wheels driven by one of these motors may begin to slip on the track due to either too rapid acceleration or insufficient adhesion between track and wheels. As a result of the increase in speed the back electromotive force of that motor will rise. Consequently, since the motors are connected in series, the current flowing through all the motors will decrease and, therefore, will diminish the torque of the motors driving the non-slipping wheels. Once the slippage of the wheels is started, the only way of eliminating it is to reduce the supply of current to the motors. This necessitates reaccelerating, and the possibility still exists that the slipping may reoccur if the acceleration is again too rapid. Such slipping causes undue wear of both tracks and wheels and results in loss of time during starting. To prevent this undesirable reaction, a number of control systems have been devised for various types of electric motor driven vehicles but none were adapted to the self-propelled type such as the Diesel-electric, and none ever achieved either the complete automatic characteristics embodied in this invention or the complete independence of the system from the master controller and any of its associated equipment.

To more clearly describe my invention, the attached diagrammatic drawings which form a part of the specification will be used. Reference will be made to the various parts by numerals and like parts in the various drawings are indicated by the same numeral.

Figure 1:
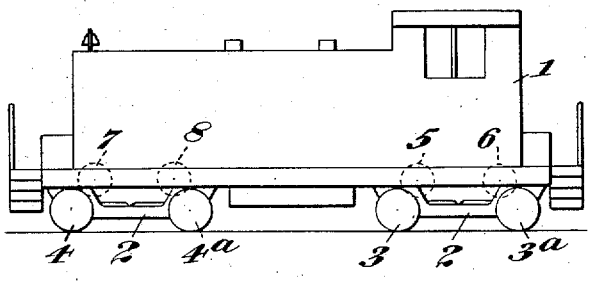
Figure 3:
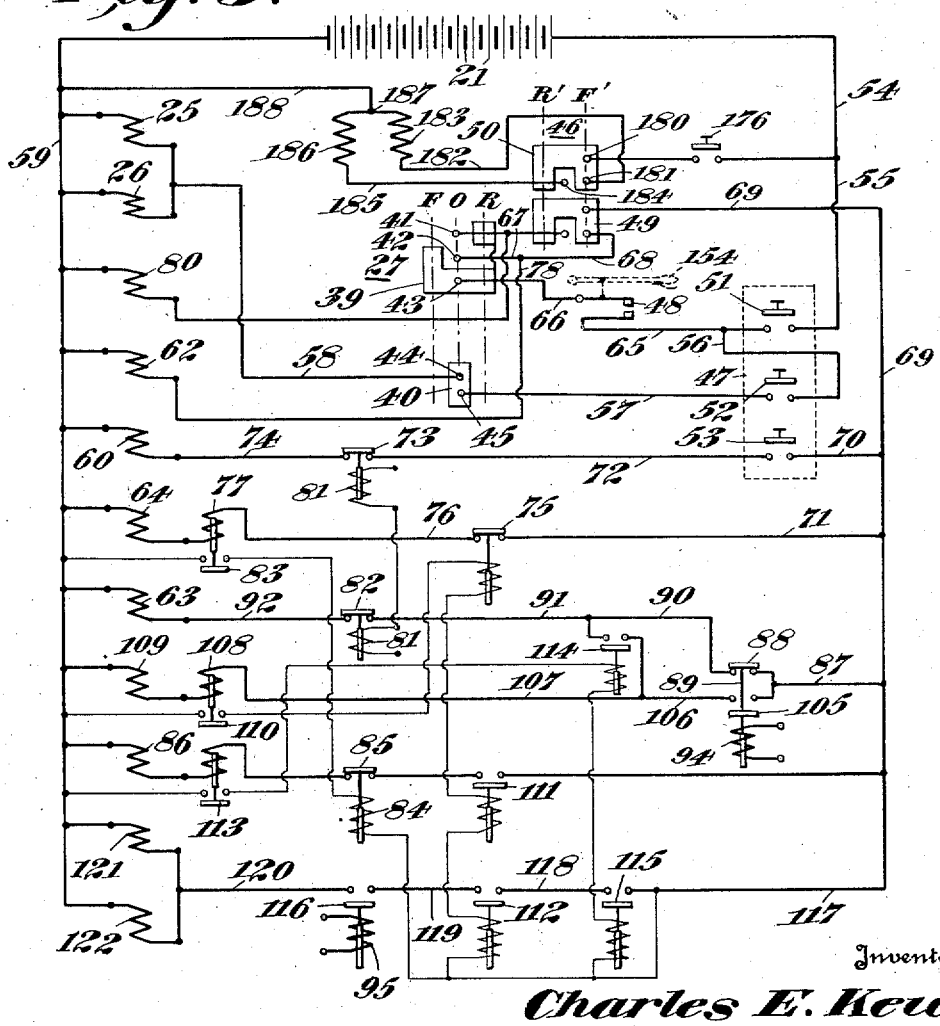
Figure 2:
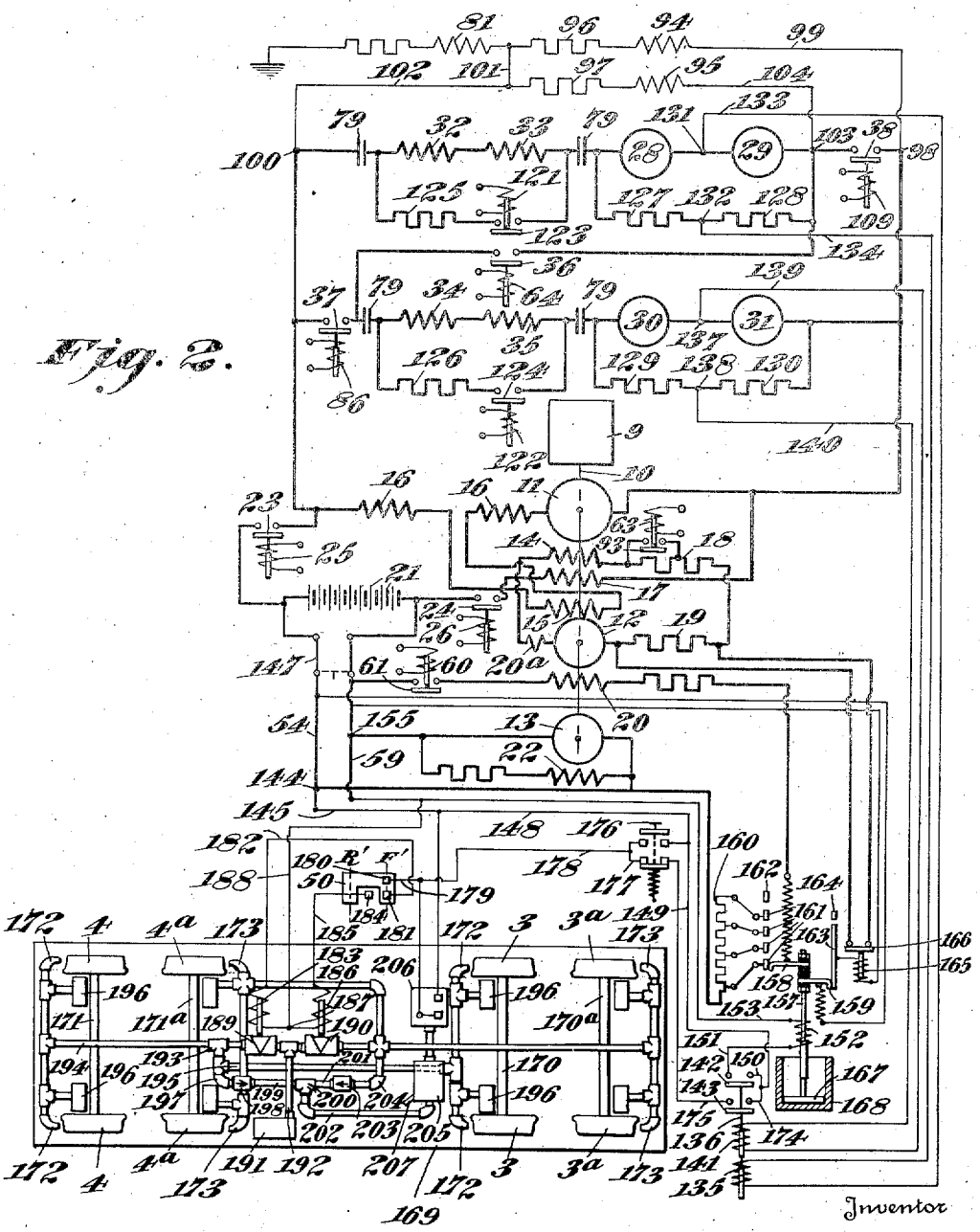

Figure 1 shows an elevation of a typical self-propelled vehicle;

Figure 2 gives diagrammatically the circuit of a self-propelled vehicle with the slip prevention circuit and the track sanding device;

Figure 3 illustrates a typical master controller and the associated circuits for governing the operation of the motors under ordinary conditions.

Figure 1 on sheet 2 shows a typical self-propelled vehicle 1 with two trucks 2 each having two sets of wheels 3, 3a, 4, and 4a, and each set being driven by an individual motor as shown by 5, 6, 7 and 8.

Figure 2 shows diagrammatically the electrical circuit of a typical self-propelled vehicle with a prime mover driving a direct current generator which supplies current to the electric motor drive consisting of four series wound motors. The prime mover 9 is shown with a drive shaft 10 to which are coupled a main generator 11, a generator field exciter 12, and an auxiliary generator 13. The generator 11 is provided with three windings comprising the separately excited field winding 14, the commutating windings 16, and the starting winding 17. The field winding 14 is separately excited by the generator field exciter 12 and has in series with it the generator field resistance 18 and 19. The exciter 12 also has three windings comprising a shunt field winding 20 separately excited by the storage battery 21, a series field winding 20a, and a differential field winding 15. The series field 20a carries the current passing from the exciter armature 12 to the main generator shunt field 14. The differential field 15 is in series with the main generator armature 11 and the commutating fields 16. The differential field 15 is wound so that it is cumulative to the shunt field 20 and differential to the series field 20a. The auxiliary generator 13, which supplies current for battery charging, is self excited by its shunt field 22. Regulation of the auxiliary generator 13 may be maintained by means of a Tirrell voltage regulator which is not shown. The battery 21 is operated in parallel with the auxiliary generator 13. Battery switch 147 connects the control circuits to the battery 21 and is normally on when the vehicle is operating.

To start the prime mover 9 the generator 11 is operated as a motor using the starting winding 17. The starting winding is connected by means of switches 23 and 24 to the battery 21, the switches being controlled by coils 25 and 26. The energization of these coils will be discussed in relation with the master controller 27 shown in Figure 3.

The main generator 11 supplies direct current to four series wound motors 5, 6, 7 and 8 shown in Figure 1, the armatures of which are shown in Figure 2 as 28, 29, 30 and 31. The series fields for these motors are 32, 33, 34 and 35, respectively.

The operation of these motors is normally governed by the prime mover throttle 154 and the master controller 27 both of which are shown in Figure 3. The throttle regulates the supply of current to the motors by its control over the prime mover 9 which drives the main generator 11. Thus the rate of acceleration and the final speed of the vehicle are dependent on the setting of the throttle.

The master controller establishes the electrical circuits that govern the operation of the motors. The motors are initially connected in series when the master controller is closed. The further changes in circuit connections are controlled by the current supplied to them. As the voltage increases suitable transition relays actuated by a certain maximum voltage change the motor connections to a series-parallel arrangement automatically.

To more clearly illustrate the operation of the throttle and the master controller and the independence of the slip prevention circuit from them, a description of the means by which the throttle and the master controller govern the operation of the motors will be given. This is shown in detail in Figure 3.

The master controller 27 consists of movable contact segments 39 and 40 and contact fingers 41, 42, 43, 44 and 45 and is adapted to complete a circuit governing forward movement of the vehicle when in position F and a circuit governing reverse movement when in position R. When in position O as shown intermediate between position F and R the controller is in off position.

Associated with the master controller are the reverser switch interlock 46, the push-button switch board 47, and the throttle switch 48 directly connected to the throttle 154. The reverser switch interlock 46 comprises two movable contact segments 49 and 50, the former assuring that the proper direction circuits are completed by the master controller and the latter determining the proper set of sand distributors that will be operated when the sanding device circuit is actuated. When in position F′ the forward direction circuits will be completed and the forward sand distributors will be actuated whereas when in R′ position the reverse will function.

On the push-button switchboard 47 are three push-button switches 51, 52 and 53. The first one, 51, connects the entire control system to the source of current. This source may be either the battery 21 alone as shown or the battery 21 in conjunction with the auxiliary generator 13 as shown in Figure 1. The second one, 52, completes the prime mover starting circuit. This starting circuit operates in the following manner. On closing switches 51 and 52, current flows from positive conductor 54 through conductor 55, the bridging contact of switch 51, conductor 56, bridging contact of switch 52, conductor 57, contact finger 45, bridging contact segment 40, contact finger 44, conductor 58, where it divides passing through coils 25 and 26 to negative conductor 59. Coils 25 and 26 actuate switches 23 and 24 connecting the starting field 17, the battery 21, and the main generator 11 all in series. The generator is operated as a motor under the excitation from the starting field and it drives the prime mover 9. This will start the prime mover which will then operate under its own power whereupon push-button switch 52 may be opened. As a safety measure contact segment 40 is moved out of engagement with contact fingers 44 and 45 when the master controller 27 is moved to either position F or R so that the prime mover starting circuit is positively opened when the motors are started.

Push-button switch 53 closes the circuit of the exciter field 20 by energizing coil 60 which closes the exciter field circuit switch 61 as shown in Figure 2. The throttle switch 48 finally completes the circuits for starting the motors as established by the master controller 27, the reverser switch interlock 46, and the push-button switchboard 47.

To start the motors the sequence of operations to be performed are as follows: Initially push-button contacts 51, 52, and 53 are closed. These energize the control circuits of the master controller, start the prime mover as previously described, and complete the exciter field circuit. The master controller 27 is moved to position F or R depending on the direction of motion desired, whereupon the reverser switch interlock 46 is moved to either F′ or R′ said interlock 46 being mechanically connected and actuated with reversing switches 79 which are controlled by direction coil 62 and 80 associated with the master controller 27.

When the throttle 154 is opened the throttle switch 48 is closed, the motors are placed in series connection, and the vehicle is started. If the master controller is in the forward position F, coils 62, 63 and 64 will be energized.

The circuit is as follows: current flows from positive conductor 54 through conductor 55, bridging contact 51, conductor 65, throttle switch 48, conductor 66, contact fingers 43 and 42 by means of contact segment 39, conductors 67 and 68, contact segment 49, conductor 69 to conductors 70 and 71. From conductor 70 the current flows on through bridging contact 53, conductor 72, ground relay bridging contact 73, conductor 74, exciter field contactor coils 60 to negative conductor 59, and from conductor 71 the current flows on through bridging contact 75, conductor 76, coils 77 and 64 to negative conductor 59. Also current flows from conductor 67 through conductor 78 and coil 62 to negative conductor 59. The energization of coil 62 actuates reversing switches 79 shown in Figure 2 so that the current flows through the series fields 32, 33, 34 and 35 of the motors in such direction as to cause forward rotation of the motors. Coil 80 in Figure 3 is the reversing coil which actuates the reversing switches 79 to cause current to flow in the opposite direction through the fields, thus reversing the rotation of the motors. The exact circuit for these reversing switches is not shown, but the mechanism is well known in the art so that it need not be described further. Coil 80 is energized when the master controller 27 is moved to position R.

The ground relay bridging contact 73 is actuated by the ground coil 81 in Figure 2 whenever any grounds occur in the motor circuits so as to prevent any serious damage. A similar bridging contact 82 is placed in the generator field contactor exciting circuit. The circuit for the actuation of these ground relay bridging contacts is shown but it is not necessary to the ordinary operation of the master controller circuits.

The energization of coil 64 actuates series switch 36, connecting the pairs of motors in series. At the same time, coil 77 is energized and it actuates interlock relay 83. Relay 83 closes a circuit which energizes interlock switch coil 84 actuating interlock switch 85 which is normally closed. This opening of the interlock switch 85 makes it impossible for the parallel switch 37 to be closed by its actuating coil 86.

At this time current also flows from conductor 69 through conductor 87, bridging contact 88 of relay 89, conductors 90 and 91, ground relay bridging contact 82, conductor 92, generator field circuit contactor coil 63 to negative conductor 59. The energization of coil 63 actuates contactor 93 which shunts a portion of the generator field resistance 18, thus increasing the excitation.

The prime mover 9 drives the main generator 11, the exciter 12, and the auxiliary generator 13. With the movement of the master controller 27 to position F the circuits are in position to connect the motor in series to the generator 9. Upon the closing of the throttle switch 48, the control circuits are energized as described above and current flows to the motors connected in series. As the throttle is opened wider the prime mover drives the generator at a faster rate and the voltage delivered to the motors increases, accelerating them.

Across the motors are connected two automatic transition relay coils 94 and 95 with their respective resistances 96 and 97 as shown in Figure 2. Coil 94 is connected from junction 98 by means of conductor 99 to junction 100 by means of conductors 101 and 102 such that when the motors are connected in series circuit, coil 94 shunts the four motors or when the motors are connected in series-parallel combination, the coil 94 shunts the parallel combination. Coil 95, is connected from junction 100 by means of conductor 102 to junction 103 by means of conductor 104 such that it always shunts the one pair of motors whose armatures are 28 and 29. Thus when the motors are in series connection, coil 95 shunts just this one pair of motors and when the motors are in series-parallel connection, the coil 95 shunts both pairs of motors. These transition relays are set to operate at certain definite values of voltage. Thus when the voltage supplied to the motor reaches the critical value for transition relay 89, it is automatically actuated. When transition relay 89 is actuated, bridging contact 88 as shown in Fig. 3 is opened, deenergizing generator field contactor coil 63, and bridging contact 105 at relay 89 is closed, completing a control circuit from conductor 69 through conductor 87, bridging contact 105, conductors 106 and 107, interlock relay coil 108, parallel contactor coil 109 to negative conductor 59. The energization of interlock relay coil 108 actuates interlock relay 110 which in turn actuates interlock switches 75, 111, and 112. Opening of interlock switch 75 disconnects the circuit of series contactor coil 64 and interlock relay coil 77 which allow the series contactor 36 to open and the interlock switch 85 to close. Actuation of interlock switch 111 and closing of interlock switch 85 energizes parallel contactor coil 86 and the coil of interlock relay 113. Energization of the coil of interlock relay 113 actuates interlock switch 115 and interlock switch 114, which reenergizes generator field contactor coil 63. These actions open the series contactor 36 and close the parallel contactors 37 and 38, thus transferring the motors from a series to a series-parallel connection. It will be noted that the series contactor coil circuit is opened by means of interlock switch 75 before the parallel contactor 37 is actuated since the circuit of parallel contactor coil 86 is held open by interlock switch 85, which is controlled by interlock relay 83 whose coil 77 is in series with the series contactor coil 64. Thus when the circuit of coils 77 and 64 is opened by the operation of interlock switch 75, interlock switch 85 in the circuit of coil 86 of parallel contactor 37 is allowed to close energizing coil 86 which actuates parallel contactor 37. By this system of interlocking circuits it is impossible for series contactor 36 to close when parallel contactors 37 or 38 are closed or vice versa.

With the motors connected in series-parallel connection by means of parallel contactors 37 and 38, the motors gain speed until the voltage in transition coil 95 reaches that value which actuates transition relay 116 completing a circuit from positive conductor 69 through conductor 117, bridging contact of interlock switch 115, conductor 118, bridging contact of interlock switch 112, conductor 119, transition relay 116 to conductor 120 where it divides and passes through coils 121 and 122 actuating, as shown in Figure 2, relays 123 and 124, respectively. The closing of relay 123 shunts the motor fields 32 and 33 with a resistance 125 and of relay 124 shunts the motor fields 34 and 35 with a resistance 126. This decreases the resistance of the circuit and increases the flow of current through the armatures with a resultant increase in speed. Thus the motors are accelerated to their maximum speed.

In case the throttle is now closed part way the main generator voltage will decrease to such a point that the voltage through the transition relay coil 95 is below that value which will actuate the relay 116. As a result the circuit of the motor field shunting contactor coils 121 and 122 will be opened, and the resistances 125 and 126 will be removed from shunting the fields 32 and 33, and 34 and 35, respectively. The motors will operate in the series-parallel position until the throttle 154 is brought back to idling position which will open the throttle switch 148 thereby opening all the control circuits.

This master control and its associated circuits are the preferred method of operation, but my invention is not dependent on this precise circuit as any master control with suitable control circuits which will cooperate with the throttle and throttle switch of a self-propelled vehicle in starting and operating said vehicle will provide the necessary control for the functioning of my system of control.

A detailed description of my invention for eliminating wheel slippage on a self-propelled vehicle will now be given.

For preventing slippage, resistors 127 and 128 in series and resistors 129 and 130 in series are placed shunting the armatures 28 and 29, and 30 and 31, respectively as shown in Figure 2. These resistors are equal in value if the resistances of the armatures are equivalent or else they are proportional to the resistances of the respective armatures which they shunt. At points 131 and 132 between the armatures 28 and 29 and between the resistors 127 and 128 respectively, are connected conductors 133 and 134, respectively, which lead to coil 135 of relay 136. Likewise at point 137 between armatures 30 and 31 and at point 138 between resistors 129 and 130 are connected conductors 139 and 140, respectively, which lead to coil 141 of relay 136.

Now when the wheels driven by one of the motors slip an unbalanced condition arises. For instance, if the motor with armature 28 should be the one involved, the increased back electromotive force in 28 would cause an unbalanced condition to arise. This unbalanced electrical circuit would produce a current in coil 135 actuating relay 136. Upon operation of relay 136 bridging contacts 142 and 143 affixed to relay 136 complete the circuits controlling the wheel slip prevention device and the sanding device, respectively.

The circuit completed by bridging contact 142 causes a current to flow from the circuit of auxiliary generator 13 at junction 144 on positive conductor 54 through conductors 145, 148, 149, 150, bridging contact 142, and conductor 151 to the coil 152 which is thus energized and thence back through conductors 153 and 59 to junction 155. The energization of coil 152, in turn, actuates contactor mechanism 157. The sliding contacts 158 and 159 which are attached to contactor mechanism 157 and which are electrically insulated from each other, are moved upward. Contact 158 adds a portion of resistance 160 by means of taps 161 into the field circuit of exciter 12, which decreases the field excitation of the main generator 11. This results in the reduction of power supplied to the motors and, depending on the degree of slipping, only that amount of resistance is inserted that is necessary to decrease the power supplied to a point where the slipping is stopped and the motor circuits rebalanced. If the unbalance is of large enough magnitude, the exciter field circuit is broken completely by raising sliding contact 158 to the open tap 162 and the field excitation of the main generator 11 is interrupted. Likewise sliding contact 159 leaves contact bar 163 to engage open contact 164 whereupon resistance 19 is inserted in the field circuit of the main generator 11. This is accomplished by the deenergization of coil 165 which drops relay 166, removing the shunt from resistance 19.

This latter circuit involving relay 165 need not be used if the residual magnetism in the shunt field 14 of the generator 11 is negligible. However, when this residual magnetism is large, resistance 19 is absolutely necessary because the residual will excite generator 11 sufficiently to slow down the correction of the slipping condition.

The circuit may also be so arranged that the exciter field circuit is not opened but just has the resistance 160 inserted when slipping occurs and removed gradually when the slipping is checked. However, the most efficient method is as indicated in the diagram and this is my preferred method. On the resistance 160 four taps 161 are illustrated, but the advisable method is to use as many as are needed to prevent arcing between sliding contact 158 and taps 161.

When the slipping has ceased, the motors are again in balanced relation with respect to the resistors 127, 128, 129 and 130. Consequently current no longer flows through either of coils 135 or 141 and relay 136 is deenergized. This in turn opens bridging contact 142 which deenergizes coil 152 allowing relay 157 to fall. However, contactor mechanism 157 is provided with a plunger 167 operating in dashpot 168 which will permit contactor mechanism 157 to rise rapidly but regulates its return at a controlled rate of acceleration slow enough to avoid wheel slippage under normal operating conditions. This allows either the insertion of resistance 160 in the circuit of the exciter field 20 and its gradual removal by means of sliding contact 158 and contact taps 161, if the exciter field circuit has been completely opened, or just the gradual removal of resistance 160, if resistance 160 has just been partially inserted in the exciter field circuit. At the same time, if the former condition prevails, sliding contact 159 engages contact bar 163 energizing coil 165 whereupon resistor 19 in the circuit of exciter 12 is shunted by relay 166. This gradual removal of resistor 160 slowly builds up the voltage delivered by main generator 11. This regulated increase in voltage automatically accelerates the motors smoothly without the operator changing the throttle position.

During this same time, the sanding device has been functioning automatically. To more fully illustrate this, a plan view of a typical self-propelled vehicle, such as was shown in Figure 1, and the arrangements for sanding are shown at 169 in Figure 2. On this vehicle are shown two trucks, each having two sets of wheels and axles, and each axle being permanently coupled to a motor (not shown). The wheels are designated by 3, 3*a*, 4, and 4*a*, and their corresponding axles by 170, 170*a*, 171 and 171*a*. In front of wheels 3 and 4 are sand distributors 172 and likewise in front of wheels 3*a* and 4*a* are sand distributors 173.

Now when relay 136 is actuated, as noted before, it closes two bridging contacts 142 and 143. Contact 143 establishes the sanding device electrical circuit from positive conductor 54, through conductors 145, 148, 149 and 174, contact 143, conductor 175, push-button contactor 176, conductors 177, 178 and 179, contact finger 180 of the reverser interlock segment 50 and, depending on whether the reverser interlock 50 is in F′ or R′ position, through either contact finger 181, conductor 182, and magnetic valve coil 183, or contact finger 184, conductor 185, and magnetic valve coil 186, to junction 187 and back through conductor 188 to negative conductor 59. The coils 183 and 186 actuate magnetic valves 189 and 190, respectively.

Magnetic valves 189 and 190 each operate identical sanding systems, the former operating the sanding distributors 172 and the latter the sanding distributors 173. As to which one is operated depends entirely on the direction in which the vehicle is traveling. If the truck with wheels 4 and 4*a* is at the forward end of the vehicle, sanding takes place from distributors 172 associated with wheels 3 and 4, whereas if the truck with wheels 3 and 3*a* is leading, sanding is performed in front of wheels 3*a* and 4*a* from their corresponding distributors 173. Reverser interlock segment 50 which operates in conjunction with the reverser switch interlock 46, which determines the direction of the travel of the vehicle in conjunction with the master controller 27, automatically selects the proper sanding circuit. Push-button 176 provides a means for manual sanding by the operator.

Since the two sanding systems are identical it will be necessary to describe only one. When magnetic valve 189 is closed, compressed air from reservoir 191 flows through pipe 192, valve 189, to junction 193 where the flow divides. Part follows pipes 194 and 195 to the sand distributors 172, one being used for each of wheels 3 and 4 and each being supplied with sand from boxes 196. The other part follows pipe 197 to the one way check valve 198 through which the air can only flow in the direction indicated by the arrow, that is, from pipe 197 to 199. Thence it flows through pipe 199 to junction 200 from which lead pipes 201 and 202. One way check valve 203 which will allow air to flow only from pipe 204 to 201 as indicated by the arrow, prevents the flow through pipe 201 so that all the air flows through 202 to the timing reservoir 205. The surge of compressed air into 205 actuates pressure switch 206. This shorts out the bridging contact 143 of relay 136.

When contactor mechanism 136 is opened upon cessation of the slipping, as explained above, contact 143 opens, but pressure switch 206 remains closed due to the action of the timing reservoir 205 and the sanding is continued until the pressure in the timing reservoir is relieved by the pressure release 207. When this occurs, pressure switch 206 is opened and coil 183 is deenergized. This releases the magnetic valve 189 and the sanding ceases.

Should slipping reoccur, the operations would be repeated until either the desired speed was achieved or it was found impossible to move the vehicle without slipping. Such a condition would be probably due to an overloaded train of cars drawn by the self-propelled vehicle and reduction of the load would be necessary to make starting possible.

From the detailed description given, it is evident that once slipping starts, the operation of the vehicle is completely taken out of the hands of the operator until the vehicle reaches the wheel speed for which the operator has initially set the throttle. Ordinarily if wheel slippage occurs, the operator, if he is at all aware of the slipping, must either reduce the power supplied or completely stop his motors. With my invention this is not at all necessary. In fact, the operator does not have to concern himself with wheel slippage until he finds that movement of the vehicle in the direction he desires is impossible.

Once the operator has opened his throttle he has only to wait until the vehicle reaches the speed for which his throttle is set. If wheel slippage occurs, my control system automatically eliminates that as hereinbefore described. Immediately following this, my system of control automatically takes over the acceleration of the vehicle at a rate slow enough to avoid any wheel slippage. The reason that wheel slippage occurs is that the rate of acceleration is a variable dependent on the operator. If he opens the throttle too far, rapid acceleration will result and wheel slippage will occur. Once slipping has occurred my control system eliminates this human element in starting, and is set for a specified rate of acceleration slow enough so that no slipping will result under ordinary conditions. When the speed of travel is reached for which the throttle is set, the control of the vehicle is automatically restored to the operator.

In the system of control described, the acceleration of the vehicle normally is dependent on two transition relays which function automatically with the amount of voltage supplied to the driving motors. The rate which the voltage is increased controls the rate of acceleration of the vehicle and is dependent on the acceleration of the prime mover. The prime mover is directly controlled by the throttle. Thus the operator can set the throttle at that position which will give him the rate of acceleration he wants. Consequently, the operator would tend to try to avoid slipping by accelerating slower than necessary. With my invention he need not consider slipping, but merely accelerate as fast as possible and, when slipping occurs, it will be automatically eliminated. Then the vehicle will be automatically accelerated at a rate controlled by my system until the speed for which the operator is holding the throttle is reached.

In case the normal system for starting the vehicle is different from that which has been described, my invention can be readily adapted to it, since my system of control functions independently of the normal control circuits. For instance, if the normal control circuit consisted of a master controller which manually governed the circuits of the pairs of motors as to whether they are in series or parallel connection, my system of control could be readily adapted to eliminate slipping in such a system just as well as in the preferred system. This adaptability to any starting control system increases its utility. The only restriction that can be placed on it is the fact that there must be one or more pairs of motors and the motors constituting each pair must be permanently connected in series. Outside of this one limitation as to the fundamental electrical control circuit of the self-propelled vehicle, my invention operates entirely independent of that fundamental control circuit.

The above detailed description is only one of various ways of performing my invention and it should not be limited thereby, but should only be restricted as specified in the appended claims.

Having thus described my invention, what I claim as new and desire to secure by Letters Patent is:

1. In combination, a self propelled vehicle and an automatic wheel slip prevention circuit, said vehicle comprising a plurality of pairs of motors, the motors of each pair being permanently connected in series, a generator supplying current to said motors, means for separately exciting said generator, a prime mover supplying the necessary power to drive said generator and governing means for controlling the ordinary operation of said vehicle; and said wheel slip prevention circuit comprising a plurality of pairs of series resistances, each pair shunting one pair of motors, a plurality of coils, each coil being connected from the terminal common to both motors to the terminal common to both resistors such that upon the occurrence of wheel slippage a current will flow through one of said coils due to an increase in the back electromotive force of the motor driving the slipping wheels, means severally actuated by said coils for interrupting the field excitation of said generator whereby the current supplied to said motors will be substantially reduced, eliminating said wheel slippage and further means for automatically, gradually restoring the excitation to said generator thereby accelerating said motors independent of said governing means.

2. In combination, a self propelled vehicle and a system of electrical control including means for eliminating wheel slippage, said vehicle comprising a plurality of pairs of motors furnishing the motive power for said vehicle, a prime mover for producing mechanical energy, converting means for changing the mechanical energy of said prime mover to electrical energy for the use of said motors, a throttle for governing said prime mover, and controlling means for regulating the electrical output of said converting means; said system of electrical control comprising, a plurality of balanced circuits each consisting of one of said pairs of motors, a pair of series connected resistors shunting said pair of motors and a coil connected between said pairs whereby any wheel slippage which unbalances one of said balanced circuits causes a current to flow in the associated coil, switching means severally actuated by the current in any one of said coils, said switching means causing said controlling means to interrupt the flow of current to said motors, substantially stopping said motors and eliminating said wheel slippage, whereupon said switching means automatically causes said controlling means to gradually increase the electrical energy supplied to said motors from said converting means, accelerating said motors without wheel slippage to the speed corresponding to the setting of said throttle but independent of said throttle.

3. In combination, a self propelled vehicle, a wheel slip prevention mechanism, and a track sanding device; said self propelled vehicle comprising a plurality of pairs of motors, the motors in each pair being permanently connected in series, a prime mover for producing mechanical energy, a conversion means for changing the mechanical energy of said prime mover to electrical energy for use by said motors, a throttle for governing the prime mover, and controlling means for regulating the supply of electrical energy from said conversion means; said wheel slip prevention mechanism comprising a plurality of balanced circuits, said balanced circuits each comprising one of said pairs of motors, a pair of series connected resistances shunting said pair of motors and a coil connected between said pairs such that upon the occurrence of wheel slippage the equilibrium of those balanced circuits will be disturbed in which are connected the motors coupled to the slipping wheels, and current will flow through the associated coils, switching means severally actuated by the current flowing through any one of said coils, said switching means causing said controlling means to suspend the supply of electrical energy to said motors, substantially stopping said motors and eliminating said wheel slippage, whereupon said switching means automatically and gradually accelerates said motors without wheel slippage by reconnecting said controlling means, all independent of said throttle; said sanding device comprising sand distributing means, relay means for controlling said distributing means, said relay means being actuated by said switching means, and interlocking means for shorting out said switching means retaining said distributing means in operation for a time after the elimination of said wheel slippage to assist in restarting.

4. In combination with a self-propelled vehicle, a system of electrical control comprising a plurality of pairs of motors which drive said vehicle, the motors of each pair being connected in series, a plurality of pairs of series connected resistors, a plurality of coils, a plurality of balanced circuits each consisting of one of said plurality of pairs of motors shunted by one of said plurality of pairs of resistors with one of said coils connected between said pairs, a relay severally actuated by said coils, and means actuated by said relay whereby any unbalance in any of said initially balanced circuits will be automatically eliminated.

5. In combination, a self-propelled vehicle and a system of electrical control, said vehicle comprising a plurality of pairs of motors, the motors of each pair being connected in series, a generator supplying current to said motors and a prime mover driving said generator; and said system of control comprising a plurality of resistors, a plurality of coils, a plurality of electrical balanced circuits consisting of one of said plurality of pairs of motors shunted by one of said plurality of pairs of resistors with one of said coils connected between said pairs, a relay severally actuated by said coils, and means actuated by said relay whereby any unbalance of said balanced circuits will be automatically eliminated.

6. In combination, a self-propelled vehicle and a system of electrical control for wheel slip prevention, said vehicle comprising a plurality of pairs of motors, the motors of each pair being permanently series connected, a generator supplying current to said motors, a prime mover driving said generator, a throttle regulating said prime mover and a master controller governing the ordinary series and series-parallel operations of said motors; and said system of control for wheel slip prevention comprising a plurality of pairs of resistors, a plurality of coils, a plurality of electrically balanced circuits, each having one of said pairs of motors shunted by one of said pairs of resistors with one of said coils connected between said pairs, a relay severally actuated by said coils, means actuated by said relay whereby when one of said balanced circuits is disturbed due to wheel slippage, said unbalance is removed independent of said throttle and said master controller.

7. In combination, a self propelled vehicle and a system of electrical control, said vehicle comprising a plurality of motors driving said vehicle, the motors of each pair being permanently connected in series, a generator supplying current to said motors, an exciter providing external excitation for said generator, a prime mover driving said generator and said exciter, a throttle for regulating said prime mover, a master controller for governing said motors, and control circuits assisting said master controller to connect said motor for series and series-parallel operation; and said system of electrical control consisting of a plurality of pairs of resistors, each pair shunting one of said pairs of motors, a plurality of coils, each coil being connected between correlated pairs of motors and resistors such that any unbalance in the back electromotive force between correlated motors in any pair will cause a current to flow in the associated coil, a relay severally actuated by said coils, a contactor mechanism actuated by said relay, means actuated by the movement of said contactor mechanism whereby said unbalance is eliminated, the elimination of said unbalance deenergizing said relay and allowing said contactor mechanism to return to normal position, means limiting said return movement of said contactor mechanism to a definite measured time travel, restarting and accelerating means for said motor controlled by the return movement of said contactor mechanism, all said means functioning independently of said throttle, and said master controller and its associated control circuit.

8. In combination, a self propelled vehicle and a system of electrical control, said vehicle comprising a plurality of pairs of motors, the motors of each pair being connected in series, a generator supplying current to said motors, a prime mover driving said generator, a throttle regulating said prime mover, and a master controller governing the regular operations of said motors; said system of electrical control comprising a plurality of pairs of series connected resistors, a plurality of coils, a plurality of normally balanced electrical circuits, each consisting of one of said pairs of motors shunted by one of said pairs of resistors with one of said coils connected from the common terminal between the motors of said pair to the common terminal between the resistors of said pair whereby any difference in counter electromotive force between the motors of said pair will unbalance said normally balanced circuit such that a current will flow through said coil, a relay severally actuated by said coils, and means energized by said relay for eliminating said difference in counter electromotive force and for accelerating said motor to the desired speed independent of said throttle and said master controller.

9. In combination, a self-propelled vehicle, a system of electrical control for preventing wheel slippage, and a track sanding device, said vehicle comprising a plurality of pairs of motors, the motors of each pair being connected in series, a generator supplying current to said motors, an exciter supplying excitation to said generator, a master controller governing the operation of said motors, control circuits associated with said master controller for connecting said motors in series and series-parallel operation, a prime mover driving said generator and said exciter, and a throttle for regulating said prime mover; said system of control comprising a plurality of pairs of series connected resistors, a plurality of coils, a plurality of balanced circuits, each consisting of one of said pairs of motors shunted by one of said pairs of resistors with one of said coils connected between said pairs, a relay severally actuated by said coils, means actuated by said relay whereby any unbalance in any of said balanced circuits produced by wheel slippage will be automatically eliminated and the track sanding device will be operated simultaneously; and said track sanding device comprising a magnetic valve actuated by said relay, sanding means controlled by said magnetic valve, and timing means actuated by said magnetic valve, said timing means shunting said relay and retaining said sanding means in operation independent of said relay whereby the sanding is continued for a time after the wheel slippage is eliminated.

10. In a system of electrical control for wheel slip prevention, a self-propelled vehicle, a plurality of pairs of motors driving said vehicle, the motors of each pair being permanently series connected, a generator supplying current to said motors, a prime mover driving said generator, a master controller governing the operation of said motors, a throttle governing said prime mover, a plurality of pairs of resistors, a plurality of coils, a plurality of balanced circuits, each consisting of one of said plurality of pairs of motors shunted by one said plurality of pairs of resistors with one of said coils connected between said pairs, such that if any wheel slippage occurs on starting said vehicle with said throttle and said master controller, the equilibrium of one of said balanced circuits will be disturbed causing a current to flow through the correlated coil, a relay severally actuated by said coils, and means actuated by said relay whereby the balance of said circuit is restored and said vehicle is automatically accelerated to the desired speed, said means functioning independently of said throttle and said master controller.

11. In combination, a self propelled vehicle and a system of electrical control including means for eliminating wheel slippage, said vehicle comprising a plurality of pairs of motors, the motors of each pair being in series, a generator supplying current to said motors, a prime mover driving said generator, a throttle controlling said prime mover, and auxiliary circuits for controlling the ordinary operations of said motors associated with said throttle; said system of control comprising a plurality of pairs of series connected resistors, each pair shunting a pair of motors, a plurality of coils, each coil connected between a pair of motors and the corresponding pair of resistors such that, if any material difference in the counter electromotive forces of the motors forming a series pair arises on starting said plurality of motors by means of said throttle, a current will flow through the correlated coil, a relay severally actuated by said coils, and means actuated by said relay whereby the current supplied by said generator is interrupted, substantially stopping said motors and eliminating said difference in counter electromotive force, and further means whereby said motors are restarted and accelerated smoothly without said difference recurring, all of said means functioning independently of said throttle and said auxiliary circuits.

12. In combination, a self propelled vehicle, a system of electrical control, and a track sanding device, said vehicle comprising a plurality of pairs of motors, the motors of each pair being permanently connected in series, a generator supplying current to said motors, a prime mover driving said generator, a throttle controlling said prime mover, and suitable auxiliary control circuits responsive to said throttle for governing said motors; said system of control comprising a plurality of pairs of series connected resistors, a plurality of coils, a plurality of balanced circuits each consisting of a pair of said resistors shunting a pair of said motors with one of said coils connected between said pairs, a relay severally actuated by said coils when the equilibrium of any of said balanced circuits is disrupted, means actuated by said relay to restore said balance and to operate said track sanding device simultaneously, independent of said throttle and said auxiliary circuits.

13. In combination, a self propelled vehicle and a system of electrical control, said vehicle comprising a plurality of pairs of motors driving the vehicle, the motors of each pair being permanently connected in series, a main generator supplying current to said motors, a separately excited field for said generator, an exciter supplying current to said generator field, a prime mover for driving said generator and exciter, a throttle for governing the speed of said vehicle by controlling the power output of said prime mover, and a master controller and suitable auxiliary control circuits for governing the operation of said motors; and said system of control comprising a plurality of pairs of resistors, each pair shunting an individual pair of motors, a plurality of coils, each coil being connected between corresponding pairs of motors and resistors such that any material difference in speed between the motors in any one of said pairs will produce a current in the associated coil, means severally actuated by said coils for interrupting the excitation of said generator from said exciter whereby the supply of current to said motors is interrupted thereby substantially stopping said motors momentarily and eliminating said speed difference, and further means whereby the motors are automatically restarted and accelerated smoothly to the desired speed, said system of electrical control functioning independently of said throttle and said master controller.

14. In combination, a self propelled vehicle and a system of electrical control, said self propelled vehicle comprising a plurality of pairs of motors driving said vehicle, the motors in each pair being permanently connected in series, a main generator supplying a current to said motors, an exciter providing field excitation for said main generator, a separately excited field for said exciter, a control circuit for regulating the operation of said motors, a master controller governing said control circuit, a prime mover driving said main generator and exciter, a throttle for governing the speed of said prime mover, an auxiliary source of current for supplying said control circuit, and a switch controlled by said throttle for connecting said auxiliary source of current to said control circuit, said system of electrical control ocmprising a plurality of pairs of series connected resistors, a plurality of coils, a plurality of balanced circuits each comprising one of said pairs of motors shunted by one of said pairs of series connected resistors with one of said coils connected between said pairs such that a difference of speed between said motors in said pair due to wheel slippage will cause a current to flow through said coil, a relay severally actuated by said coils, a contactor mechanism and a sanding device controlled by said relay, said contactor mechanism consisting of a movable shaft, a plunger attached to the lower end of said shaft, a dash-pot in which said plunger operates, a pair of wiper arms affixed to said shaft, a resistance normally shunted out of the field circuit of said exciter by one of said wiper arms, and a second resistance normally shunted out of said main generator field by the other of said wiper arms, whereby on actuation of said relay, said contactor mechanism moves to place said first resistance in the field circuit of said exciter, and on further movement increases the amount of this added resistance and at the completion of its movement opens the exciter field circuit and inserts the second resistance in the main generator field circuit, thereby interrupting the source of current to said motors, eliminating wheel slippage, and restoring the equilibrium of said balanced circuits; whereby said contactor mechanism is allowed to return to its initial position but at an automatically controlled rate due to the action of said dashpot said rate being such that the first resistance is slowly removed from the exciter field circuit thereby slowly accelerating said motors automatically at a controlled rate slow enough to avoid wheel slippage; and said sanding device comprising magnetic valves actuated by said relay, pneumatic sand distributors controlled by said magnetic valves, a pneumatic pressure switch actuated by said magnetic valves, and a timing pressure release valve for controlling the operation of said pressure switch whereby the track in front of the wheels is sanded automatically and the sanding is continued after the elimination of wheel slippage due to the action of said pressure switch to assist in restarting, said system of control operating independent of said throttle and master controller.

15. In combination, a self propelled vehicle, a system of electrical control, and a track sanding device, said vehicle comprising a plurality of pairs of wheels adapted to travel on a track, an axle for each pair of wheels, a plurality of pairs of motors, the motor of each pair being permanently connected in series and each motor being permanently coupled to a separate axle, a main generator supplying current to said motors, a separately excited field circuit for said generator, an exciter providing the external excitation for said generator field circuit, a separately excited field circuit for said exciter, an auxiliary source of current providing external excitation for said exciter field circuit, a prime mover driving said generator and said exciter, a throttle for regulating the power delivered by said prime mover and in turn the speed of said vehicle, and a master controller with suitable auxiliary control circuits for governing the ordinary operation of said motors; said system of control comprising a plurality of pairs of resistors, each pair shunting a pair of motors, a plurality of coils, each coil connected from the terminals between motors of each pair to the terminals between the resistors of each pair such that when one pair of wheels slips on the track a current will be produced in the coil connected in the circuit of the motor coupled to said pair of wheels due to the difference in counter electromotive force between said motor and its series pair, a relay severally actuated by said coils, a contactor mechanism actuated upwardly by said relay, a variable resistance, means whereby on the upward movement of said contactor mechanism said resistance is inserted in the exciter field circuit, a resistance in the generator field circuit, shunting means normally short circuiting said resistance in the generator field circuit, means whereby on further upward movement of said contactor mechanism the exciter field circuit is opened and the shunting means is removed from said resistance in the generator field circuit such that the current supply to said motors is interrupted, the motors are substantially stopped, said slipping is eliminated, said coils are deenergized, said relay is released, and said contactor mechanism is allowed to move downward; a dashpot for providing definitely measured downward time movement of said contactor mechanism, means whereby said controlled downward movement of said contactor mechanism replaces said resistance in the exciter field circuit and replaces said shunting means around said resistance in the generator field circuit, further means whereby said controlled downward movement of said contactor mechanism progressively removes by small increments said resistance in the exciter field circuit such that the motors are automatically restarted and accelerated to the desired speed smoothly and without slipping of said wheels, all said means functioning independently of said master controller and its associated circuits and of said throttle; said track sanding means operating simultaneously with said slip prevention means, and comprising a magnetic valve actuated by said relay simultaneously with said contactor mechanism, pneumatic means whereby said magnetic valve controls the sanding of said tracks, a timing reservoir which functions when said magnetic valve is closed, a pressure switch operated by said timing reservoir and held closed for an interval of time determined by said timing reservoir, said interval of time being longer than the total time of the upward and downward movements of said contactor mechanism, and means whereby said pressure switch shunts out said relay thereby maintaining said sanding device in operation after said relay is deenergized.

16. In combination, a self propelled vehicle and a system of electrical control, said vehicle comprising a plurality of pairs of motors, the motors in each pair being permanently connected in series, a generator to supply current to said motors, a separately excited field circuit for said generator, an exciter for supplying said field excitation, a prime mover driving said generator and exciter, a throttle controlling the speed of said prime mover, a master controller governing the operation of said motors, and control circuits associated with said master controller for governing the ordinary series and series-parallel operations of said motors; said system of control comprising a plurality of pairs of series connected resistors, a plurality of coils, a plurality of balanced circuits each composed of one pair of said motors shunted by one pair of said resistors with one of said coils connected between said pairs such that any unbalance of currents through said pair of motors will produce a current in said coil, a relay switch severally actuated by current flowing through any one of said plurality of coils, switching means operated by said relay switch whereby the field excitation of said generator is interrupted thereby substantially stopping said motors and restoring the equilibrium of said balanced circuits, whereupon said switching means will automatically reestablish the excitation of said generator at a controlled rate so as to accelerate said motors without unbalance of currents independent of said throttle and master controller.

17. In combination, a self propelled vehicle and a system of electrical control, said vehicle comprising a plurality of pairs of series motors driving said vehicle, the motors in each pair being permanently connected in series, a main generator for supplying current to said motors, a separately excited field for said generator, means for exciting said field, a prime mover for driving said generator, and a throttle for governing said prime mover; said system of electrical control comprising a plurality of pairs of series connected resistors, a plurality of coils, a plurality of balanced circuits each consisting of one pair of said motors shunted by one of said pairs of resistors with one of said coils connected between said pairs of motors and resistors such that a current will flow through said coil whenever there is a difference of speed between the motors constituting said pair, switching means severally actuated by said coils whenever a current passes through one of them, said switching means interrupting said field excitation for said generator, whereby said motors are substantially stopped and said speed difference is eliminated, and further switching means whereby said field excitation is gradually restored to its original value automatically so that said motors are accelerated at such a rate that no speed difference arises, all independent of said throttle.

18. In combination, a self propelled vehicle and a system of electrical control, said vehicle comprising a plurality of pairs of motors driving said vehicle, the motors in each pair being permanently connected in series, a generator for supplying current to said motor, a separately excited field for said generator, exciting means for said field, a prime mover furnishing the driving energy for said generator, and a throttle for governing said prime mover; said system of electrical control comprising a plurality of balanced circuits each consisting of one of said pairs of motors, a pair of series connected resistors shunting said pair of motors, and a coil connected between said pairs, such that any wheel slippage will disturb the electrical equilibrium of said balanced circuits due to an increase in back electromotive force of the motor associated with the slipping wheel and current will flow through said coil, switching means severally actuated by the current flowing through any one of the coils of said balanced circuits, a mechanism for sanding the tracks, said switching means interrupting the field excitation of said generator and actuating said mechanism for sanding the tracks thereby substantially stopping said motors and eliminating said wheel slippage, whereupon further switching means will automatically gradually restore said field excitation accelerating said motors at a controlled rate without wheel slippage independent of said throttle, said sanding mechanism operating for a time after the elimination of said wheel slippage to aid in restarting.

19. In combination with a self propelled vehicle and a wheel slip prevention means, a track sanding device comprising sand distributing means, relay means actuating said sand distributing means, said relay means being responsive to wheel slippage, interlocking means shorting out said relay means and maintaining said sand distributing means in operation for a time after elimination of wheel slippage by said wheel slip prevention means.

20. In combination, a self-propelled vehicle and a system of electrical control including a means for controlling wheel slippage, said vehicle comprising a pair of motors permanently connected in series, a generator supplying current to said motors, and a prime mover driving said generator; said system of electrical control comprising a pair of series connected resistors, a coil, an electrically balanced circuit which assumes an unbalanced condition upon the occurrence of wheel slippage comprising said pair of motors shunted by said pair of resistors with said coil operatively connected between said motors and resistors so that when wheel slippage unbalances said circuit said coil is energized, and means actuated by said energized coil to eliminate said unbalanced condition.

21. In combination, a self-propelled vehicle and a system of electrical control including means for eliminating wheel slippage, said vehicle comprising a pair of series wound motors permanently connected in series, a main generator for supplying current to said motors, a separately excited field for said generator, electrical means for exciting said field, a prime mover driving said generator, and a throttle for governing said prime mover; said system of electrical control comprising a pair of series connected resistors, a coil, a circuit consisting of said pair of motors shunted by said pair of resistors with said coil connected between the pairs whereby a current will flow through said coil whenever there is a difference of speed between the motors of said pair due to wheel slippage, switching means actuated by said energized coil, said switching means interrupting said field excitation for said generator, whereby the current supply to said motors is substantially stopped and said speed difference is eliminated, and whereupon said switching means automatically restores said field excitation to its original value so that said motors are accelerated to the speed corresponding to the throttle setting, all independent of said throttle.

22. In combination, a self-propelled vehicle, and a system of electrical control including means for controlling wheel slippage, said vehicle comprising a pair of motors permanently connected in series, a generator supplying current to said motors, a separately excited field for said generator, electrical means for exciting said field, a prime mover for driving said generator, and a throttle for governing the operation of said prime mover; said system of electrical control comprising a pair of series connected resistors, a coil, a balanced circuit consisting of said pair of motors shunted by said pair of resistors with said coil operatively connected between said motors and resistors whereby upon the occurrence of wheel slippage said coil is energized, switching means actuated by said energized coil for interrupting the excitation of said generator field whereby the current supply to said pair of motors is substantially stopped and said wheel slippage is eliminated, said switching means restarting and accelerating said motors upon elimination of wheel slippage and upon continued repetition of said wheel slippage, said system of control functions to eliminate each repetition, all independent of said throttle.

23. In combination, a self-propelled vehicle, a system of electrical control including wheel slip controlling means, and a track sanding device; said vehicle comprising a pair of motors to drive said vehicle, said motors being permanently connected in series, a generator for supplying current to said motors, electrical means for separately exciting said generator, a prime mover for driving said generator, and a throttle for governing the prime mover; said system of electrical control comprising a pair of series connected resistors, a coil, a balanced circuit consisting of said pair of motors shunted by said pair of resistors with said coil connected between said motors and resistors such that upon the occurrence of wheel slippage said circuit is unbalanced and a current flows through said coil, switching means actuated by said energized coil to eliminate said wheel slippage and to operate said sanding device simultaneously; said switching means interrupting said generator field excitation and substantially stopping said motors, and said switching means thereupon restoring said generator field excitation whereby said motors are accelerated automatically without recurrence of said wheel slippage; and said track sanding device comprising pneumatic sand distributing means, magnetic means responsive to said switching means and controlling said pneumatic sand distributing means, timing means pneumatically actuated by said magnetic means and arranged to maintain said sand distributing means functioning after elimination of said wheel slippage to aid in restarting said vehicle.

24. In combination, a self-propelled vehicle, a system of electrical control including means to control wheel slippage, and a track sanding device, said vehicle comprising a pair of permanently series connected motors driving said vehicle, a prime mover for supplying mechanical energy to said vehicle, a conversion means for changing said mechanical energy to electrical energy for the use of said motors, and governing means for controlling said prime mover; said system of control comprising a pair of series connected resistors, a coil, a balanced circuit arranged to be unbalanced upon the occurrence of wheel slippage consisting of said pair of motors shunted by said pair of resistors with said coil connected between said motors and resistors whereby upon the occurrence of any unbalance due to wheel slippage said coil is energized, switching means actuated by said energized coil for interrupting the flow of electrical energy from said conversion means to said motors thereby eliminating said wheel slippage, and simultaneously actuating said track sanding device, and upon elimination of said wheel slippage said switching means automatically restoring the flow of electrical energy to said motors; said track sanding device comprising magnetic means responsive to said switching means, sand distributing means actuated by said magnetic means, timing means actuated by said magnetic means, said timing means shorting said switching means so that the operation of said sand distributing means is maintained for a time after the elimination of wheel slippage.

25. In combination, a self-propelled vehicle and a system of electrical control including a wheel slip controlling means, said vehicle comprising a plurality of pairs of motors driving said vehicle, the motors of each pair being permanently connected in series, a generator supplying current to said motors, a separately excited field for said generator, a prime mover driving said generator, and governing means for operating said prime mover; said system of control comprising a plurality of pairs of series connected resistors, a plurality of coils, a plurality of balanced circuits, any one of which assumes an unbalanced condition upon the occurrence of wheel slippage, each comprising one of said plurality of pairs of motors shunted by one of said plurality of pairs of resistors with one of said coils operatively connected therebetween so that when wheel slippage unbalances any one of said circuits the corresponding coil is energized, switching means severally actuated by said energized coil, said switching means interrupting the field excitation of said generator thereby substantially interrupting the current supplied to said motors and eliminating said wheel slippage, and said switching means thereupon automatically restoring said field excitation and accelerating said motors, all independent of said governing means.

26. In combination, a self-propelled vehicle and a system of electrical control, comprising a plurality of traction motors, a generator supplying power to said motors, a prime mover driving said generator, power output regulating means for said generator, and control means for said power output regulating means for governing the power supplied to said motors whenever a difference in speed occurs between any of said motors.

27. In a drive and control system, a source of power comprising a generator, output regulating means therefor and a prime mover for driving said generator, a plurality of driving motors, means for connecting said motors in series to said generator and control means for said output regulating means, said control means being responsive to slight differences in speed between said motors to prevent overspeeding of any one of said driving motors.

28. In a drive and control system for a vehicle comprising a plurality of driving axles having driving wheels fixed thereon, a plurality of traction motors, each motor being operatively connected to drive an individual driving axle, a prime mover generator power plant supplying power to said motors, means for connecting said motors in series circuit relation with said generator, output regulating means for said power plant and control means for said output regulating means, said control means acting automatically and promptly in response to slight differences in speed between the motors resulting from driving wheel slippage to cause a reduction in the output of the power plant, thereby to promptly check overspeeding of any motor and wheel slippage.

29. In a vehicle drive and control system comprising a prime mover generator power plant, output regulating means therefor, a plurality of pairs of vehicle traction motors connected in series, means for connecting pairs of motors in series or parallel relation with the generator of the power plant, generator excitation reducing means operable to cause a reduction in the power output of the generator to a negligible value, and automatic control means having separate connections with each pair of motors and adapted to act promptly in response to slight differences in the back voltage between the motors of each pair of motors due to a slight overspeeding of any motor of any pair of motors to control operation of the generator excitation reducing means to promptly check overspeeding of any motor of a pair of motors.

CHARLES E. KEW.